No. 854,982. PATENTED MAY 28, 1907.
S. S. CHILDS.
SPRING WHEEL.
APPLICATION FILED JAN. 9, 1907.

WITNESSES:
E. A. Pell
S. A. Rogers

INVENTOR
Samuel S. Childs
BY
Wm H. Campfield
ATTORNEY

UNITED STATES PATENT OFFICE.

SAMUEL S. CHILDS, OF BERNARDSVILLE, NEW JERSEY.

SPRING-WHEEL.

No. 854,982.   Specification of Letters Patent.   Patented May 28, 1907.

Application filed January 9, 1907. Serial No. 351,441.

*To all whom it may concern:*

Be it known that I, SAMUEL S. CHILDS, a citizen of the United States, residing at Bernardsville, in the county of Somerset and State of New Jersey, have invented certain new and useful Improvements in Spring-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a spring wheel, and is designed to provide a wheel that has a body portion having a rim surrounding it with a space between them, and the body portion having wings projecting radially from it and bearing, on each side, on a spring, these springs being arranged on the opposite sides of each wing, and arranged longitudinally in the rim so that the body portion of the wheel is suspended from the sides of the wheel, being assisted by radially arranged springs properly disposed.

A further object of the invention is to provide this wheel so that in starting and stopping, or in transmitting motion from one element to the other, the springs act to take off all shock in the starting or stopping, to cause the springs, when compressed, to act as transmitting mediums between the wings of the felly and the rim.

The invention is illustrated in the accompanying drawings, in which

Figure 1:
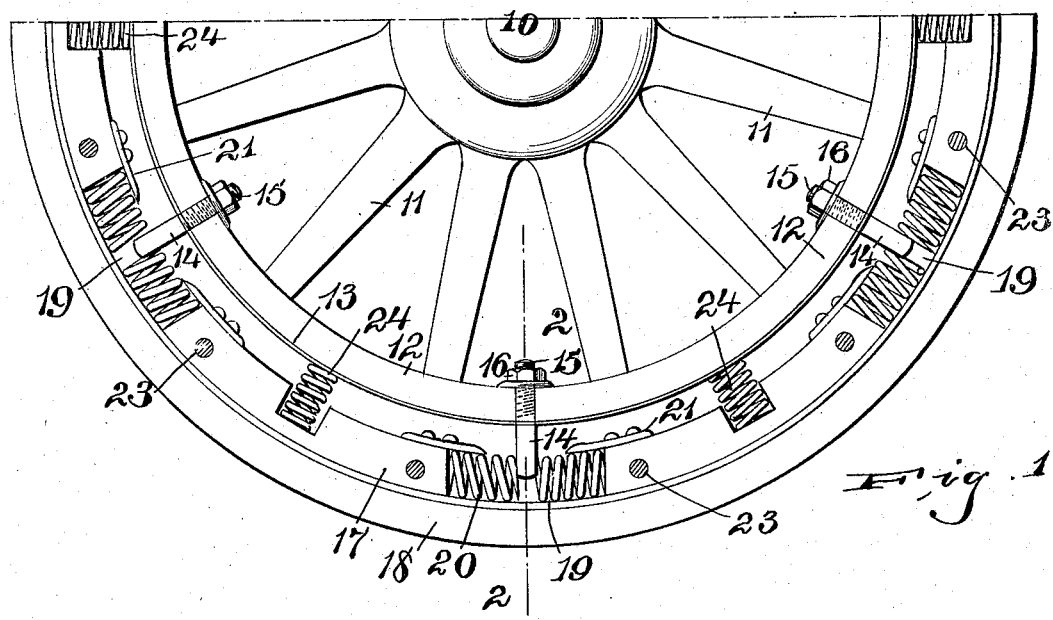
Figure 2:
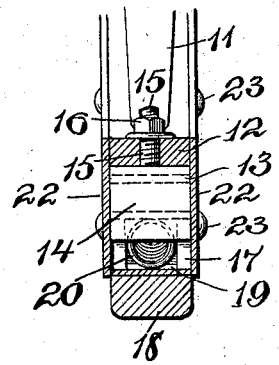

Figure 1 is a side view of one half of a wheel of my new construction, with the side plate removed. Fig. 2 is a section on line 2, 2, in Fig. 1, and Fig. 3 is a section of a wing of a modified form.

The wheel is composed of a body portion having the hub 10, the spokes 11 and a felly 12, these being of any construction desired. The felly 12 is surrounded by a metallic band 13, the purpose of which will be described hereinafter. Arranged at suitable points in the felly, are the radially projecting wings 14 which are set up part way into the felly to give them a better bearing, and each of the wings is provided with a bolt 15, preferably integral therewith, and this bolt receives a nut 16 which secures the wing solidly to the felly. Surrounding the felly, and at a distance therefrom, is the rim 17 which has, on its periphery, any desired form of tire 18. Each wing 14, of the felly, projects into a recess 19, arranged in the rim 17, and between the ends of each recess and the opposite sides of the wing 14, is a pair of springs 20, one spring being on each side of the wing 14. On each side of each recess, and secured to the inner side of the rim, are the plates 21 which prevent the springs 20 being snapped out of their recesses, and also assist the springs, when they are compressed, as transmitting mediums.

It will be seen, from this structure, that the springs on the sides of the wheel take up the spring action, due to the running of the vehicle, and the wings, which happen to be at the top and bottom, slide between the springs on each side of them, allowing a free movement of the wheel. The springs arranged longitudinally in the rim, as above described, are assisted by springs 24 that are suitably disposed and radially arranged between the rim and the felly, and preferably secured in a recess in the rim, or a recess in the felly. The metallic band 13, on the felly, strengthens the felly and receives the wear due to the action of the springs 24. The springs 24, however, can be dispensed with if the vehicle is a light one. On each side of the wheel I arrange an annular plate or ring 22 which is secured to one of the elements, preferably the rim, by means of the bolts 23. This plate, on each side, keeps the elements in line, stiffens the wheel, and keeps out dust.

Figure 3:
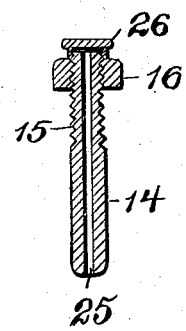

If it is desired to make a wheel to provide an easy lubricating of the springs, the wings can be made as shown in Fig. 3, being provided with a perforation 25, and having a closure for the perforation, as the cap 26. This allows the insertion of a lubricant through the wing, and one or all of the wings can be made this way, if desired.

The particular shape of the wings and the particular arrangement and shape of the springs 20 are not essentially as illustrated herein, and slight changes might be made without interfering with the operation of the device, or with the limits of the invention.

Having thus described my invention, what I claim is:—

1. A spring wheel comprising a body portion having a felly, a rim surrounding the felly at a distance therefrom, wings projecting from the felly, and springs between the opposite faces of the wings and connected to the rim, the wings being perforated to allow the insertion of a lubricant.

2. A spring wheel comprising a body portion having a felly, a rim surrounding the felly at a distance therefrom the rim being recessed, springs in the recesses and abutting on the ends thereof, wings projecting from the felly and between the springs, side plates secured to the rim, and plates partly covering the open side of the recesses.

In testimony, that I claim the foregoing, I have hereunto set my hand this seventh day of January 1907.

SAMUEL S. CHILDS.

Witnesses.
WILLARD W. CUTLER,
E. A. PELL.